United States Patent
Holt

[11] 4,148,067
[45] Apr. 3, 1979

[54] MODULATED GROOVE RECORDS WITH A THICK METAL LAYER AND METHOD FOR MAKING SAME

[75] Inventor: Lyn Holt, Maidenhead, England
[73] Assignee: E M I Limited, Hayes, England
[21] Appl. No.: 664,068
[22] Filed: Mar. 5, 1976

[30] Foreign Application Priority Data

Mar. 7, 1975 [GB] United Kingdom ................ 9505/75

[51] Int. Cl.² ......................... H04N 5/76; G11B 3/70
[52] U.S. Cl. ........................... 358/128; 179/100.4 C; 274/46 C; 204/5; 204/38 A
[58] Field of Search ....................... 358/128, 127, 299; 179/100.1 B, 100.4 C, 100.4 M, 100.4 R, 100.41 G; 235/61.11 H, 61.12 R, 487, 488; 274/46 C, 41 A; 204/5, 38 A, 58; 29/527.2, 527.4

[56] References Cited

U.S. PATENT DOCUMENTS

| | | | |
|---|---|---|---|
| 3,072,543 | 1/1963 | Lubow | 179/100.1 B |
| 3,783,196 | 1/1974 | Stanley | 179/100.1 B |
| 3,833,408 | 9/1974 | Matthies | 358/128 |
| 3,842,194 | 10/1974 | Clemens | 179/100.4 M |
| 3,842,217 | 10/1974 | Clemens | 179/100.1 B |
| 3,900,370 | 8/1975 | Germscheid | 204/38 A |
| 3,982,066 | 9/1976 | Nyman | 358/128 |

FOREIGN PATENT DOCUMENTS 1392201  4/1975  United Kingdom ............. 179/100.1 B

*Primary Examiner*—Bernard Konick
*Assistant Examiner*—Alan Faber
*Attorney, Agent, or Firm*—Fleit & Jacobson

[57] ABSTRACT

A modulated groove record, such as a video disc, has a coating on a conductive layer bearing the modulated groove formed from the material of the layer. The material may be aluminium and the coating may be a uniform dielectric of aluminium oxide formed by anodizing. The groove may be impressed in the aluminium surface by applying a matrix to an aluminium/plastics laminate forcefully and rapidly so that the aluminium yields while the plastic appears rigid. The aluminum layer thickness is at least twenty times the depth of the groove.

22 Claims, 1 Drawing Figure

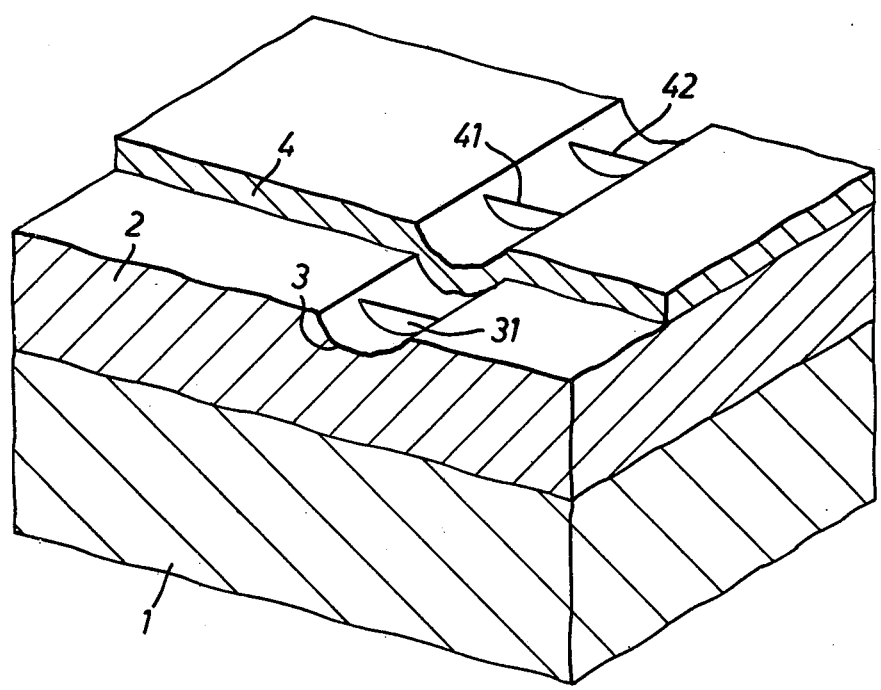

MODULATED GROOVE RECORDS WITH A THICK METAL LAYER AND METHOD FOR MAKING SAME

This invention relates to modulated groove records.

Modulated groove records and record/replay systems have been proposed, e.g. U.S. Pat. Nos. 3,783,196, 3,842,194, 3,842,217 and U.K. patent specification No. 1392201-6 especially for high information rate signals such as video and video/audio, in which modulations in a groove in a record medium are read-out for replay by a stylus tracing the groove and sensing a variation in the electrical parameter of capacity between one electrode of a conductive layer formed in or under the record medium and another electrode formed in or around the stylus, a dielectric being present between the electrodes. The above-mentioned Specifications all require the deposition, e.g. by sputtering, of a thin, i.e.c. 500 Å, layer of aluminium or other conductive material on a groove pressed in a thermoplastic disc and the subsequent deposition of a layer some 500 Å thick by glow discharge of polystyrene as a dielectric. However the sputtering and glow discharge stages require a vacuum chamber and as each replica record made must undergo the separate vacuum chamber stages the process is expensive in time and equipment and operator skill to give a good yield of satisfactory products. Furthermore large chambers are required for any reasonable production rate of 12" records, the conventional size for a half hour video programme.

It is an object of the invention to provide an improved method of making a modulated groove record.

According to the invention there is provided a method of making a modulated groove record on which information is stored by the groove modulation including providing on a support a layer of a conductive material having a modulated record groove surface and causing material of the layer to form a dielectric coating including material in the layer and following the shape of said modulated surface.

The support may be of a tough but flexible insulating material such as polyvinylchloride. The record groove may be formed by applying pressure with a matrix before or after the conductive material is provided on the support. The layer may be of 99% or purer annealed aluminium in the form of a foil at least 30 microns thick. The dielectric coating may be produced as a uniform coating by anodising the aluminium to a thickness between 250 Å and 4000 Å. A lubricant for a tracing stylus may be introduced into the dielectric coating. The coating may be a dielectric.

According to the invention there is also provided a modulated groove record on which information is stored by the modulation of the groove, the groove being in a layer of conductive material and having a dielectric coating formed from the material and following the form of said modulation.

The invention further provides a method of forming a groove modulated with information in a conductive surface, for coating with a dielectric as one electrode of a capacitive modulated groove record information store, including providing on a support of a plastics material having a flat support surface a layer of conductive material thinner than the support and impressing the modulated groove in the surface of the layer by pressing a matrix of the modulated groove against the surface under press conditions in which the conductive material surface is deformed but the plastics material resists deformation, retaining the flat support surface.

The invention also further provides a modulated groove capacitive information record including a support of plastics material, a layer of conductive material on the support, a surface of the layer impressed with the groove modulated with information and a uniform coating of a dielectric on the electrode formed by the impressed surface.

Embodiments of the invention will now be described with reference to the accompanying drawing showing a section of a record groove.

A disc of a tough flexible insulating support material e.g. a plastics material such as polyvinylchloride or a mixture of similar vinyl plastics and other materials, part of which is shown at reference 1, has attached thereto a layer 2 of a conductive medium, such as annealed aluminium foil 30 to 75 microns thick of 99.9% purity, applied while the plastics material is in a softened condition. The plastics material may be of a wide range of thickness at least between 0.1 and 10 mm but preferably 0.5-3 mm. A record groove 3 is formed in the foil record layer 2 which forms one electrode for replay. In a preferred embodiment the modulated record groove is formed to a depth of 0.5 micron (5000 Å) in an operation similar to that of pressing a conventional microgroove record by using a matrix in a press which impresses the modulated groove into the surface of the aluminium foil record layer, the record being of the same general form as such a microgroove record. It is desirable that the plastics material is not deformed either permanently or temporarily by the impressing action. Accordingly a very rapid press action is preferred, e.g. a "flypress" so that the plastics material is effectively rigid and the aluminium soft to receive the impression in the surface of the layer. A suitable matrix may be formed using techniques proposed for such matrices with groove densities of some 500–6000 lines/inch and a frequency response up to some 5 MHz.

For use as a video record medium a frequency modulation system may be used in which the information is recorded as a series of bars, one of which is shown at 31, across the groove at varying spacings of the bars providing an output signal of a frequency modulated by the recorded information. One type of modulation for a colour video disc record is described in the above Patent Specifications but clearly the present invention relates to the manner in which the modulations are replicated for commerce and the exact nature of the modulation system is not relevant other than as far as it affects the form of modulation in the groove.

For tracing by a stylus in a capacitive mode a dielectric layer is formed on the record medium to provide the dielectric of a capacitor, one plate of which is in the stylus and the other of which is the conductive medium. The dielectric layer is shown at 4 and in the case of an aluminium foil record layer is formed from the material as an aluminium oxide layer some 1000 Å thick on the surface of the foil for example in the well known anodising manner in an electrolytic cell. A suitable cell is one based on barrier layer techniques using ammonium tartarate solution as is used for dielectric capacitors in which the thickness of the anodised layer is closely related to the applied voltage, assisting in the production of a uniform layer. As the layer 4 is of uniform thickness on the surface and in the groove of the record medium when formed by anodising the spacing and form of the modulation bars will be faithfully reproduced as shown at 41 and 42, although the shape may change a little. The layer 4 may be as thin as 250 Å and still provide sufficient electrical insulation between the electrodes or as thick as 4000 Å and still provide a large enough capacitance between the electrodes by virtue of the dielectric constant of about 9. This is some three times the dielectric constant of polystyrene, proposed hitherto to provide a capacitance variation.

If required a lubricant such as fluorosilicone may be introduced into the dielectric aluminium oxide layer and held in a reservoir formed by pores of the layer to lubricate a tracing stylus. The lubricant may be introduced, in an evaporative solvent if required, by being spread over the disc surface.

The invention has been specifically described with reference to a frequency modulated disc record groove for replay for capacitive stylus tracing but clearly other forms of modulation, record shape and replay can be used while retaining the advantages of simple production on a readily available aluminium/plastics laminated material to provide a record of high dielectric strength and wear resistance with an inherently uniform thickness of dielectric layer available from the anodising process. Aluminium has the advantage that it does not work harden at the above purity.

Furthermore materials other than aluminium and aluminium oxide are suitable. Thus tantalum can be sputtered onto a pressed plastic record surface to adhere thereto and anodised to provide a tantalum oxide ($Ta_2O_5$) coating of higher dielectric constant than aluminium oxide for easier replay by a capacitive tracing stylus system. In the figure the surface of layer 2 would be the pressed plastic disc surface and layer 4 would be the sputtered tantalum and tantalum oxide. Niobium or zirconium could replace tantalum.

The record described above, which is especially suitable for video and video/audio signals, has a modulated groove in a conductive material coated with a dielectric formed from the conductive material, which dielectric can have better wear resistance and dielectric strength and a higher dielectric constant than plastics materials such as polystyrene. The method of making such a record dielectric by e.g. anodising is simpler than proposals for depositing plastics materials as a dielectric by vacuum chamber methods. The method of impressing a groove in the conductive material laminated with a plastics support also avoids the use of a vacuum chamber in the preliminary step of forming the grooved conductive layer. Although the preparation of only a single grooved surface on a support has been described clearly double sided records could be produced if required as is known for conventional, audio, records. Suitable conditions for impressing an aluminium/plastics laminate are a pressure of 5000 lb/sq. inch for less than 20 milliseconds.

Although a fly-press has been mentioned as a suitable machine for performing the invention other presses, even those applying a steady pressure, would be suitable provided pressure is applied so that the aluminium yields before the plastics support. A pressure of 5000 lb/sq. inch is the accepted yield stress for aluminium; although the value may vary with press technique. The purity of 99.9% is preferred but aluminium of lesser purity e.g. 99%, can be impressed with video record grooves.

What I claim is:

1. A method of making a modulated groove record on which information is stored by the groove modulation including providing on a support a layer of a conductive material in the form of a metal foil and having a modulated record groove surface, the thickness of said layer being at least twenty times the depth of said groove, and causing material of the layer to form a dielectric coating including material of the layer and following the shape of said modulated surface.

2. A method according to claim 1 including anodising the material to form a uniform dielectric coating.

3. A method according to claim 2 including introducing a lubricant for a tracing stylus into the dielectric coating.

4. A method according to claim 1 including providing a conductive material layer of aluminum of foil form of at least 99% purity.

5. A method according to claim 4 including anodising the aluminium to produce uniform oxide dielectric coating having a thickness in the range 250 to 4000 Å.

6. A method according to claim 4 including pressing the modulated groove into the surface of a layer of aluminium foil of between 30 and 75 microns thickness.

7. A method according to claim 2 including pressing the modulated groove into a plastics support surface and vacuum sputtering tantalum as the conductive material onto the grooved plastics surface.

8. A modulated groove record on which information is stored by the modulation of the groove, the groove being in a layer of conductive material in the form of a metal foil, the thickness of said layer being at least twenty times the depth of said groove and having a dielectric coating formed from the material and following the form of said modulation.

9. A record according to claim 8 in which the coating is an oxide of the material.

10. A record according to claim 9 in which the coating is a dielectric of anodic aluminium oxide of a uniform thickness in the range 250 Å to 4000 Å.

11. A record according to claim 8 in which the layer of conductive material is supported on a plastics support of thickness between 0.5 and 3 mm.

12. A record according to claim 8 in which the stored information is a video signal for recovery by a capacitive groove-tracing stylus.

13. A method of forming a groove modulated with information in a conductive surface, for coating with a dielectric as one electrode of a capacitative modulated groove record information store, including providing on a support of a plastics material having a flat support surface a layer of a conductive material in the form of a metal foil thinner than the support and at least twenty times the depth of said groove and impressing the modulated groove in the surface of the layer by pressing a matrix of the modulated groove against the surface under press conditions in which the conductive material surface is deformed but the plastics material resists deformation, retaining the flat support surface.

14. A method according to claim 7 including providing said support and conductive material as a laminate of a plastics layer some 0.1 to 10 mm and preferably 0.5 to 3 mm thick and at least one thinner annealed aluminium layer attached thereto.

15. A method according to claim 13 in which the conductive material is aluminium of at least 99.9% purity and a thickness between 30 and 75 microns.

16. A method according to claim 13 in which the matrix is pressed against the conductive material at a pressure of 5000 lb/sq. inch for less than 20 milliseconds.

17. A method according to claim 13 including coating the impressed conductive surface with a dielectric by depositing said dielectric thereon.

18. A method according to claim 13 including coating the impressed conductive surface with a dielectric by causing the material of the conductive surface to form said dielectric.

19. A method according to claim 18 including anodically oxidising said conductive material to a uniform dielectric coating.

20. A modulated groove capacitive information record including a support of plastics material, a layer of conductive material on the support, said layer being in the form of a metal foil of thickness at least twenty times the depth of the groove, a surface of the layer impressed with the groove modulated with information and a uniform coating of a dielectric on the electrode formed by the impressed surface.

21. A record according to claim 20 in which said layer is aluminium of thickness between 30 and 75 microns supported on a sheet vinyl plastics material.

22. A record according to claim 20 in which the dielectric is an oxide of the material selected from the group of materials aluminium, tantalum, niobium and zirconium.

* * * * *